(12) United States Patent
Richman et al.

(10) Patent No.: US 6,879,419 B2
(45) Date of Patent: Apr. 12, 2005

(54) LASER SCANNER WITH PERIPHERAL SCANNING CAPABILITY

(75) Inventors: Dennis C. Richman, Irvine, CA (US); Susan Raffensperger, Seal Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/310,307

(22) Filed: Dec. 5, 2002

(65) Prior Publication Data

US 2004/0114205 A1 Jun. 17, 2004

(51) Int. Cl.[7] .............................................. G02B 26/08
(52) U.S. Cl. ...................... 359/203; 359/201; 359/204; 359/211; 359/208; 359/833
(58) Field of Search ................ 359/201, 203, 359/205, 208, 209, 211, 212, 17, 566, 729, 731, 831, 833, 837, 853, 856, 859

(56) References Cited

U.S. PATENT DOCUMENTS

| | | | |
|---|---|---|---|
| 5,465,142 A | 11/1995 | Krumes et al. | 365/946 |
| 5,471,326 A | 11/1995 | Hall et al. | 359/15 |
| 5,903,386 A | 5/1999 | Mantravadi | 359/15 |
| 6,604,436 B1 * | 8/2003 | Lewandowski et al. | 73/865.6 |

* cited by examiner

*Primary Examiner*—James Phan
(74) *Attorney, Agent, or Firm*—Louis L. Dachs

(57) ABSTRACT

The present invention relates generally to ladar and more particularly to a tilted primary clamshell lens laser scanner for transmitting a generally collimated beam of radiation at a first frequency such that the beam rotates about a central axis so as to form a conical scanning pattern suitable for lidar applications. In addition, the ladar includes a system for transmitting at least one additional collimated beam of radiation at a second frequency at a wider angle then the first collimated beam.

7 Claims, 5 Drawing Sheets

US 6,879,419 B2

LASER SCANNER WITH PERIPHERAL SCANNING CAPABILITY

BACKGROUND OF THE INVENTION

1. Field of the Invention

The invention relates to the field of laser scanners for aircraft such as helicopters and, in particular, to a laser scanner of the type having additional peripheral scanning capability such that a large spatial volume is scanned in front of the aircraft.

2. Description of Related Art

Laser infrared radar, commonly referred to as ladar, is well known. In a typical ladar device, a solid state laser generates intense infrared pulses having beam widths as small as 30 seconds of arc. Ladar is commonly utilized to measure the density of clouds, smog layers, and other atmospheric discontinuities via the scattering effects afforded thereby. Ladar is also commonly utilized to track airborne objects such as balloons, smoke puffs, rocket trails, etc., via the beam reflections therefrom.

As those skilled in the art will appreciate, the use of lidar is facilitated by various mechanisms, which effect scanning of the transmitted light beam. According to contemporary methodology, it is desirable to cause the collimated laser output of the ladar device to scan in a generally circular pattern wherein the beam itself forms a cone about an axis defined along the scanned direction. Thus, as the beam is swept, the conical scanning pattern defines a substantial spatial volume. In U.S. Pat. No. 5,471,326 "Holographic Laser Scanner And Rangefinder" by J. T. Hall, et al., discloses a scanner which not only scans in a circular pattern, but moves plus or minus 12.5 degrees in azimuth, greatly increasing the area covered.

U.S. Pat. No. 5,465,142 "Obstacle Avoidance System For Helicopters And Other Aircraft" by Krumes, et al. comprises a scanner for transmitting a generally collimated beam of radiation such that the beam rotates about an axis to form a conical scanning pattern. The scanner includes a concave parabolic reflector having a geometric axis and a focus, a rotation mechanism for effecting rotation of the concave parabolic reflector about a rotation axis thereof which is angularly offset with respect to the geometric axis of the concave parabolic reflector. An opening is formed in the concave parabolic reflector near the rotation axis thereof. A convex parabolic reflector is disposed along the rotation axis of the concave parabolic reflector and has a focus, which is approximately co-located with the focus of the concave parabolic reflector.

Directing collimated radiation through the opening formed in the concave parabolic reflector and onto the convex parabolic reflector while rotating the concave parabolic reflector about the rotation axis thereof effects transmission of a generally collimated beam of radiation such that the beam rotates about the rotation axis so as to form a conical scanning pattern.

In U.S. Pat. No. 5,903,386 "Tilted Primary Clamshell Lens Laser Scanner" by M. V. Mantravadi, et al., the scanner transmits a generally collimated beam of radiation such that the beam rotates about an axis to form a conical scanning pattern. The scanner includes a concave parabolic reflector having a geometric axis and a focus point. A motor is used to rotate the reflector about an axis of rotation that is angularly offset with respect to the geometric axis of the reflector. A convex reflector is located at the focus point of the concave reflector on the rotational axis thereof. The convex reflector has a focus point co-located with the focus point of concave reflector. Thus collimated radiation directed through a hole in the concave reflector onto the convex reflector is reflected back to the concave reflector. Therefore, as the concave reflector rotates, the collimated beam of radiation is transmitted in a conical scanning pattern. The patent to Mantrvadi, et al. is a significant improvement to the prior art in that it is simple to manufacture. However, it would be desirable to provide the device with additional peripheral scanning capability such that a large spatial volume is scanned in front of the aircraft.

Thus, it is a primary object of the invention to provide a laser type scanner for aircraft and the like.

It is another primary object of the invention to provide a laser type scanner for aircraft and the like capable of scanning a large spatial volume in front of the aircraft.

SUMMARY OF THE INVENTION

The present invention specifically addresses and alleviates the above-mentioned deficiencies associated with the prior art. More particularly, the present invention is a scanner for transmitting at least two generally collimated beams of radiation of different frequencies such that the beams rotate about an axis to form a conical scanning pattern. In detail, the scanner includes a housing having an open end. A frame member is rotatably mounted within the housing having a first end and an open second end extending to the open end of the housing and having an axis of rotation. A concave parabolic reflector is mounted within the frame member at its first end having a geometric axis and with the geometric axis angularly offset from the axis of rotation of the frame member. Preferably, the rotation axis is offset with respect to the geometric axis by an angle of between approximately 5 degrees and approximately 7 degrees. The concave reflector includes an opening near the axis of rotation.

A convex parabolic reflector is disposed along the rotation axis and having a focus which is approximately co-located with the focus of the first reflector. This convex reflector is adapted to transmit at least one of the collimated beam of radiation and to reflect at least one collimated beam of radiation. A collimating lens is disposed at the opening formed in the concave reflector directing the at least two collimated beams of radiation through the opening formed therein and onto the convex reflector. A prism is mounted to the frame member behind the convex reflector co-incident therewith, which receives the at least one collimated beam of radiation transmitted through the convex reflector. A mirror is mounted to the frame member behind the prism for reflecting the at least one collimated beam of radiation diffracted by the prism radically outward from the axis of rotation. A circular diffraction screen is mounted on the housing, which extends about the axis of rotation for diffracting the at least one collimated beam of radiation reflected from the mirror forward.

A motor is incorporated into the housing for rotating the frame member at high speed, on the order of 110 revolutions per second. A second motor is included for rotating the housing in azimuth, preferably plus and minus 15 degrees. Thus it can be seen that the present invention can effectively increase the degree of conical scanning of the output of a ladar device. The invention is relatively simple in construction and which is comparatively inexpensive to fabricate and maintain.

In a second embodiment of scanner, the prism and mirror are replaced by a diffraction grating and the peripheral diffraction grating mounted in the housing is eliminated. Therefore, beams that pass through the convex reflector strike the diffraction grating and are diffracted and pass directly out of the housing. In a third embodiment of the scanner the convex reflector is designed to reflect at least two beams to the concave reflector. A second diffraction grating is positioned about the convex reflector at the front end on the frame member. Thus the two beams reflected off the first reflector pass through this second diffraction grating causing the two beams to be diffracted at different angles.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
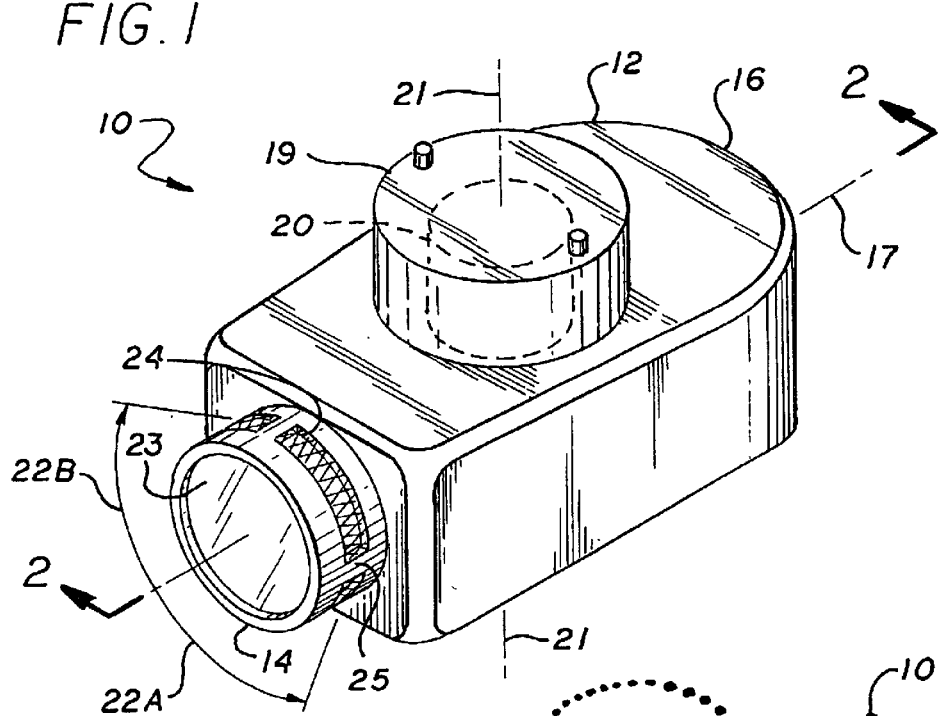
FIG. 1 is a perspective view of the scanning device partially broken away to show the azimuth control system.
Figure 2:
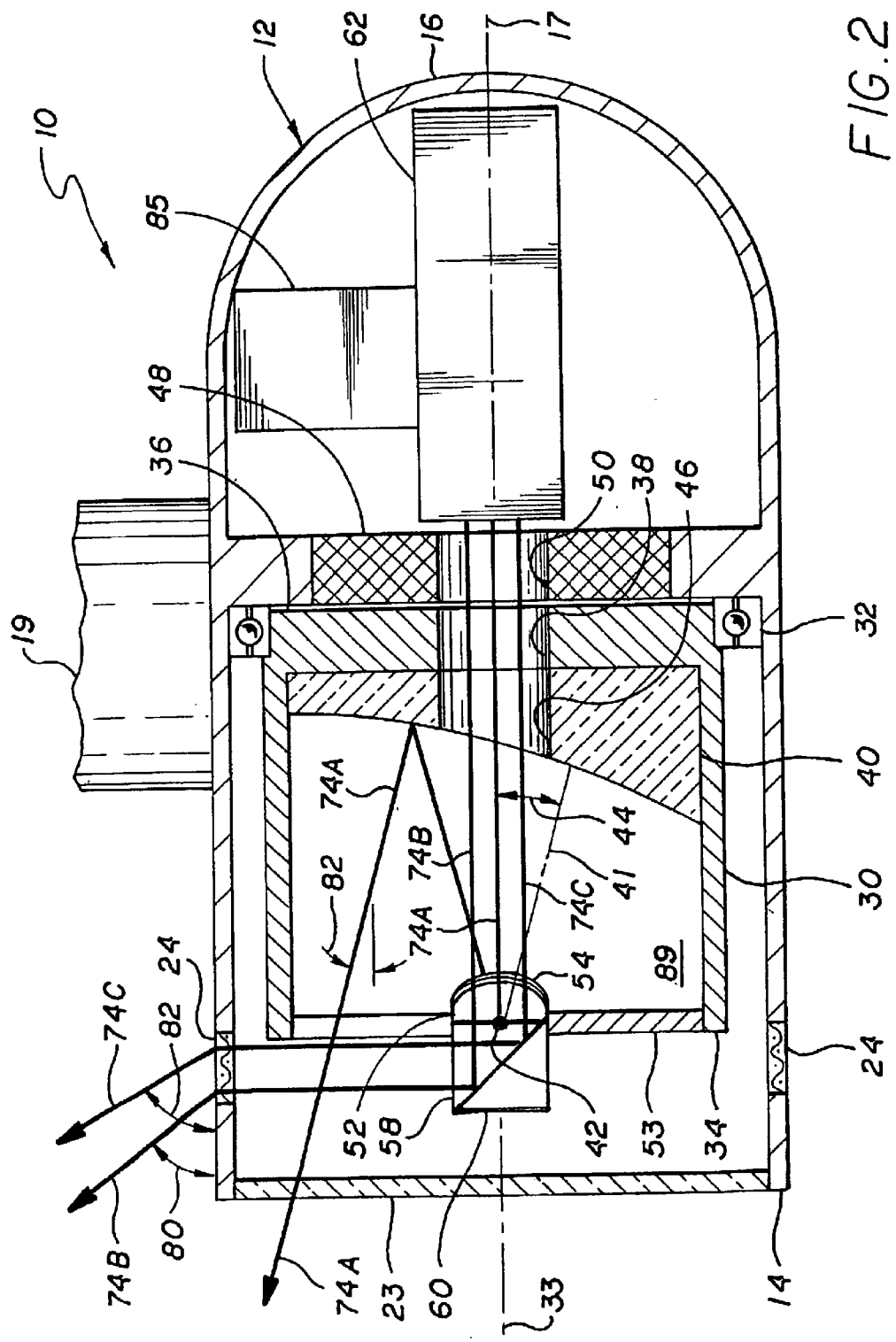
FIG. 2 is a cross-sectional view of the scanning device shown in FIG. 1 taken across the line 2—2
Figure 3:
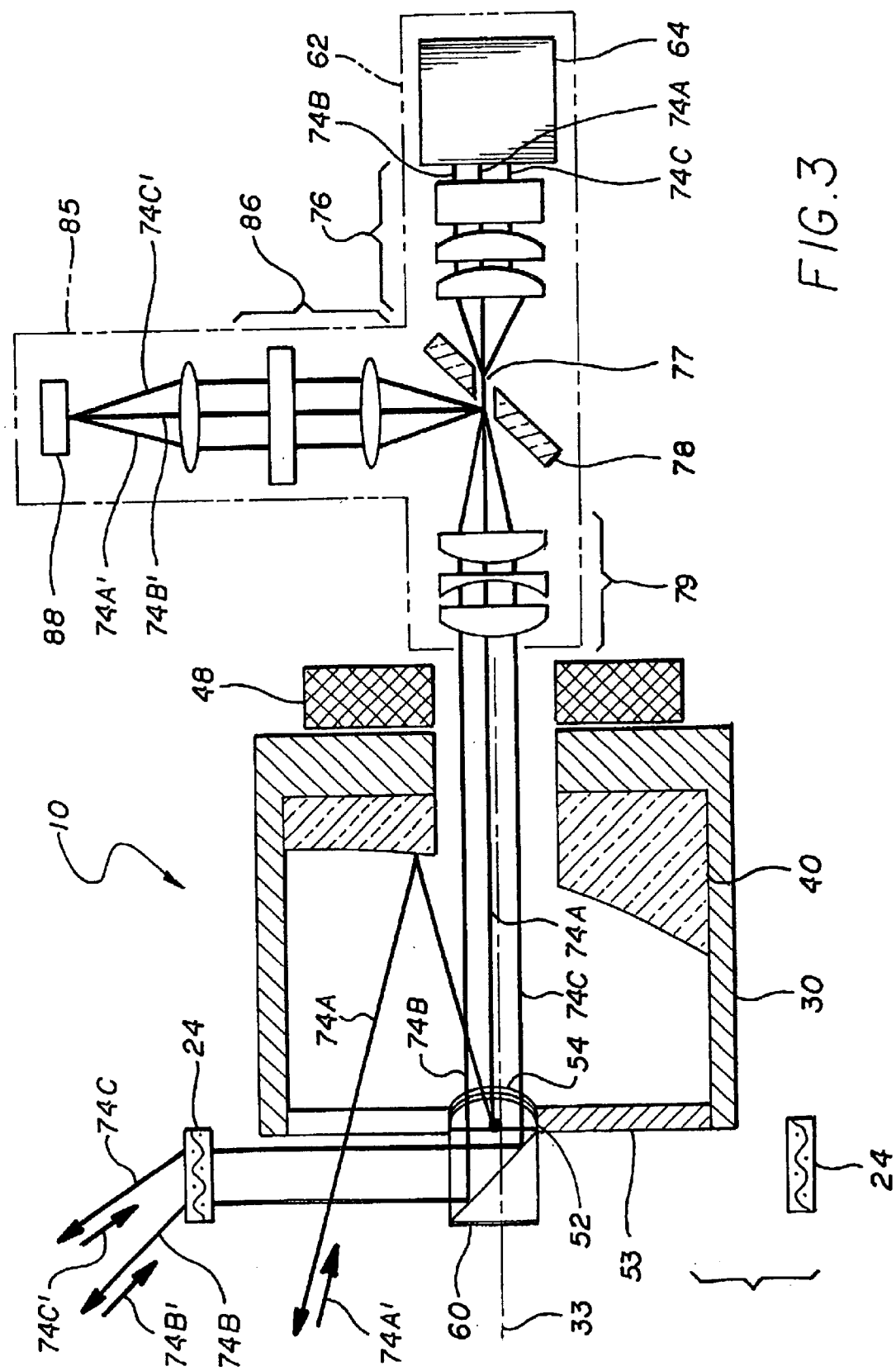
FIG. 3 is a simplified view of FIG. 2 expanded to show the lasers used to provide the collimated beams of radiation and the optical system used to process the outgoing and return collimated laser beam.

The laser scanner assembly of the present invention is illustrated in FIGS. 1–3, with scanner assembly generally indicated by numeral 10. Referring now to FIG. 1, the scanner 10 design is based upon the design disclosed in U.S. Pat. No. 5,903,386 "Tilted Primary Clamshell Lens Laser Scanner" by M. V. Mantravadi, et al., herein incorporated by reference. Thus any details not discussed herein may be found in the referenced patent. The Scanner 10 includes a hollow housing 12 having an open first end 14 and closed of second end 16 and a longitudinal axis 17. The housing 12 is suspended from a support structure 19, which includes a motor 20 for rotating the housing 12 in azimuth about a vertical axis 21. There are numerous motor systems 20 that can be used. For example U.S. Pat. No. 5,465,142 "Obstacle Avoidance System For Helicopters And Other Aircraft" by Krumes, et al. discloses a suitable design and this patent is herewith incorporated by reference. Azimuth rotation angles are indicated by numerals 22A and 22B, typically plus or minus 15 degrees, but it may be more or less. A protective transparent cover 23 is mounted in the front end 14. Just behind the front end 14 is a diffraction grating 24 that extends completely around the housing 12 only disrupted by support beams 25.

Still referring now to FIGS. 1–3, rotatably mounted within the housing 12 is a hollow cup shaped frame member 30 supported by bearing 32. The frame assembly 30, includes axis of rotation 33 aligned with the longitudinal axis 17 of the housing 12, an open front end 34 and closed rear end 36. The rear end 36 incorporates an opening 38 aligned with the axis of rotation 33. Mounted within the frame member 30 is a parabolic concave reflector (clamshell lens) 40 having a geometric axis 41. The geometric axis 41 has an angular offset angle 44 to the rotation axis 33. According to the preferred embodiment of the present invention this offset angle 44 is between approximately 5 degree and approximately 7 degrees, preferably approximately 6.3 degrees.

The focus point 42 of the first reflector 40 is located at the front end 34 of the frame member 30. The concave reflector 40 also includes an opening 46 aligned with the axis of rotation 33 and opening 38 in the frame member 30. A preferred method of manufacture of the reflector 40 is provided in U.S. Pat. No. 5,465,142 "Obstacle Avoidance System For Helicopters And Other Aircraft" by Krumes, et al. An axial motor 48 is attached to the rear end 36 of the frame member 30 to provide high-speed rotation in the 110 Hz range. The motor 48 also includes an opening 50 there through aligned with openings 38 and 46.

A convex parabolic reflector 52 having a focus identical to the focus 42 of the first mirror 40 and mounted to the front end 34 of the frame member 30 at the axis of rotation 33 by means of spider beams 53. Mounted on the convex reflector 52 is a prism 58 coupled to a mirror 60, both aligned with diffraction grating 24. The convex reflector 52 is made of a transparent glass such as clear zinc sulfide. A coating 54 is made of multiple layers of a dielectric material forming a dichroic filter. Suitable dielectric materials are titanium dioxide and silicon dioxide. Thus the convex reflector 52 can be designed to reflect laser beam pulses in a specific frequency range and transmit laser beams in a different frequency range.

Mounted within the housing 12 behind the motor 48 and frame assembly 30 is a laser transmitter Assembly 62 comprising a laser transmitter module 64 transmitting at least two diverging pulsating laser beams, and as illustrated three beams one 74A at 0.98$\mu$ meters, one 74B at 1.3$\mu$ meters and one 74C at 1.5$\mu$ meters. The three diverging laser beams 74A, B and C pass through a focusing lens assembly 76 through a small slit 77 in a mirror 78 to a collimating less assembly 79 wherein the three beams are collimated. The collimated beams 74A, B and C then pass through holes 50, 46 and 36 on to reflector 52.

The reflector 52 with coating 54, is designed to reflect laser beam 74A at the 0.98$\mu$ meter wave length and pass laser beams 74B at 1.3$\mu$ meters and 74C at 1.5$\mu$ meters on to a prism 58. Such a Beam 74B is passes through the prism 58 and is reflected by mirror 60 to diffraction grating 24 where it is diffracted by an angle 80 of 30 degrees to the rotational axis 33. The beam 74C also passes through the prim 50 and is reflected by the mirror 60 to the diffraction grating 24 where it is diffracted by angle 82 of 60 degrees to the rotational axis 33. The diffraction grating 24 may be comprise two different grating periods, one to diffract beam 74B by a desired angle and one to diffract beam 74C by a desired second angle. Alternately, a single grating period may be used for both beams 74B and 74C, in which case, if the grating period is chosen so as to diffract beam 74B 30 degrees, then beam 74C will be diffracted by an angle according to the following equation:

$$(SIN(\theta)) = \lambda/d$$

Where:
θ is the exit angle,
λ is the wavelength, and
d is the period

The laser beam 74A is reflected on to the reflector 40 wherein it is transmitted forward at an angle 44 the rotational axis 33. Beam Return signals, indicated by 74A', 74B' and 74C' travel a reverse path. Because the frame member 30 is rotating during the time-of-flight of the return signals 74A', 74B' and 74C', they strike the mirror 78 and are directed to detector assembly 85. In detail, the return signals 74A', 74B' and 74C', pass through relay lens assembly 86, which focuses the return beams to avalanche photo-detectors 88.

Note that as disclosed in the U.S. Pat. No. 5,465,142 "Obstacle Avoidance System For Helicopters And Other Aircraft" Krumes, et al., the space 89 between the first reflector 40 and second reflector 52 can be filled with a glass spacer also made of zinc sulfide glass. Since beams passing there through will be refracted by the glass, the amount of off set angle 44 can be reduced. In addition, the reflector 52 can be bonded to the glass, eliminating the spider beams 53.

Figure 4:
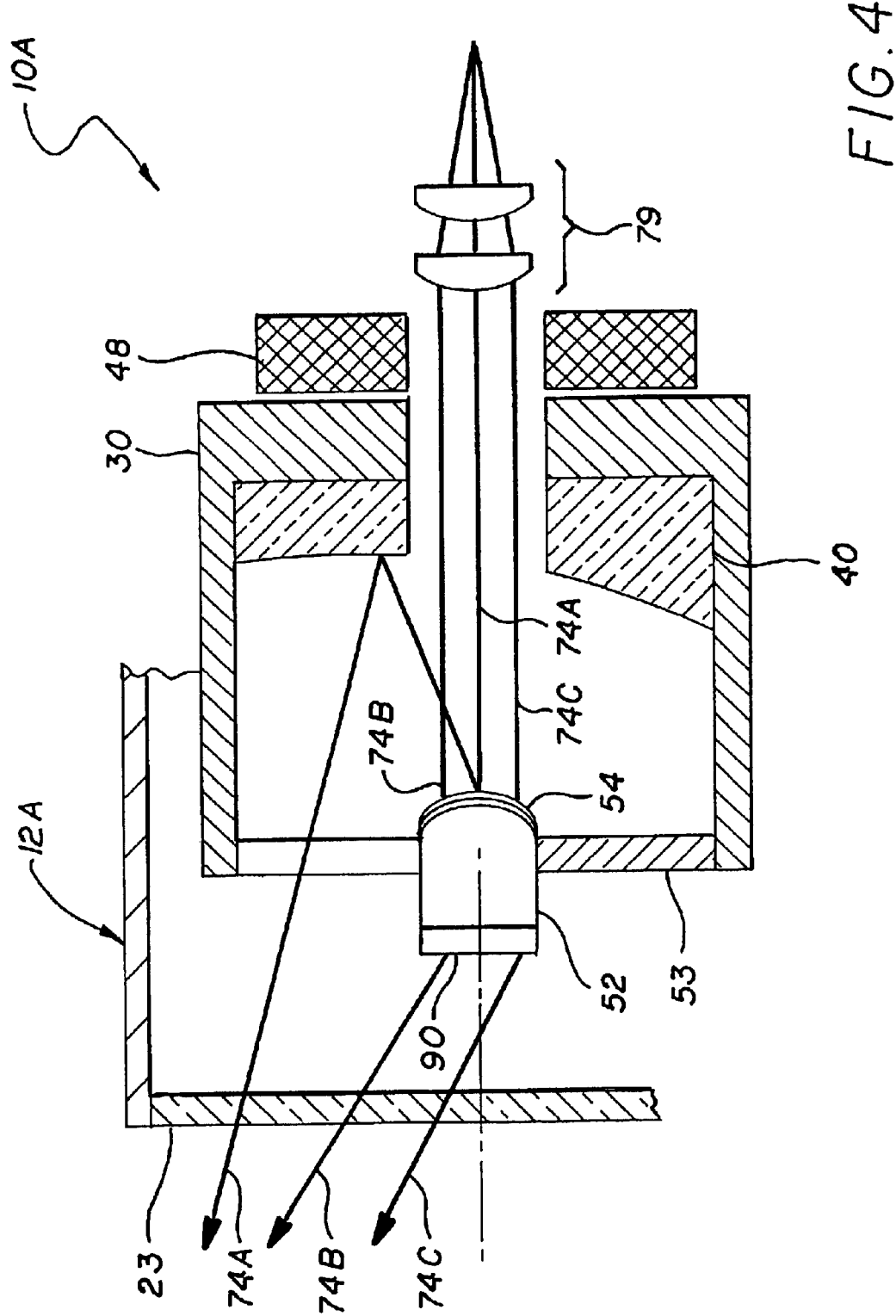
FIG. 4 is a partial simplified view of FIG. 2 illustrating a second embodiment of the invention.

A second embodiment of scanner, generally designated by numeral 10A, is illustrated in FIG. 4. The housing 12A includes a frame assembly 30, and concave and convex reflectors, 40 and 52 respectively, which are all identical to previous embodiment. The difference is that the prism 58 and mirror 60 are replaced with a diffraction grating 90 and the diffraction grating 24 is eliminated. In the example illustrated in FIG. 4, the beam 74B and 74C pass through convex reflector 52 and strike the diffraction grating 90. Diffraction gratings have a very high chromatic dispersion, so the beam 74B and 74C are deviated by different amounts. The optimum exit angles for the 3 beams at three different wave-lengths are dependent upon the azimuth range of motion, angles 22A and 22B. If the azimuth moves through plus or minus 15 degrees, then the optimum exit angles (for zero gaps in azimuth coverage) are 15, 45 and 75° from the axis 33 of the concave reflector 40. The exit angle of the beam 74A is determined by the tilt of the primary mirror. The exit angles of the 1.3 and 1.5 μm beams are determined by the diffraction grating period determined by the previously mentioned formula. If the grating period is chosen so as to deviate the beam 74B by 45 degrees, then the beam 74C will be deviated by 55 degrees, as shown in FIG. 4. Different wavelengths and grating parameters may be selected to optimize exit angles and diffraction efficiencies.

Figure 5:
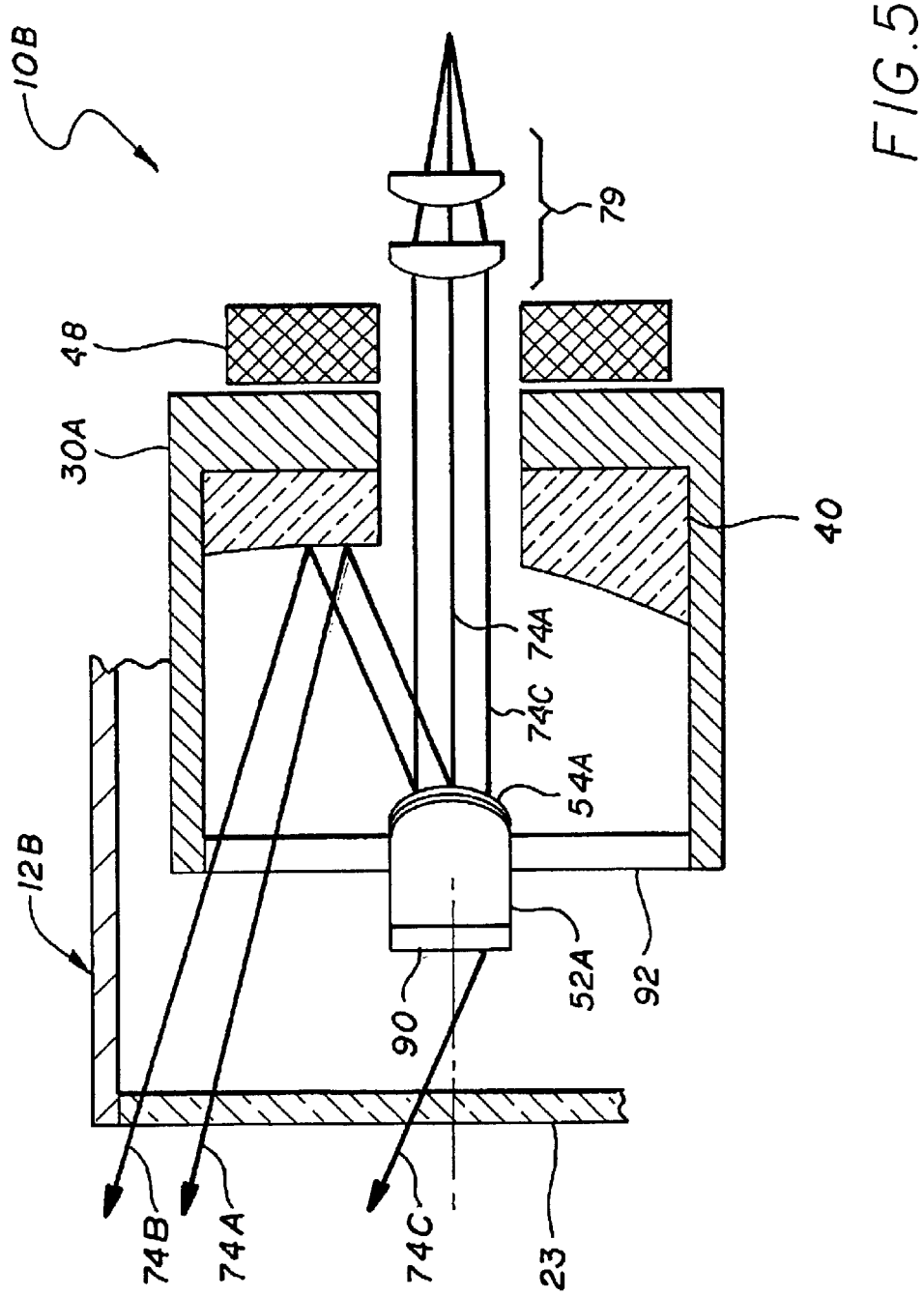
FIG. 5 is a partial simplified view similar to FIG. 4 illustrating a third embodiment of the invention.

In a third embodiment, illustrated in FIG. 5, The scanner 10B includes a housing 12B having a frame member 30A. The main difference is that the convex reflector 52A with a coating 54A is designed to reflect beams 74A and 74B and transmit beam 74C. Beam 74C is diffracted by diffraction grating 90 as in the second embodiment. However the spider frame is replaced by a second diffraction grating 92, which supports the reflector 52A and grating 90. The diffraction grating 92 diffracts the beams 74A and 74B outward from the concave reflector different amounts due their difference in frequencies.

Figure 6:
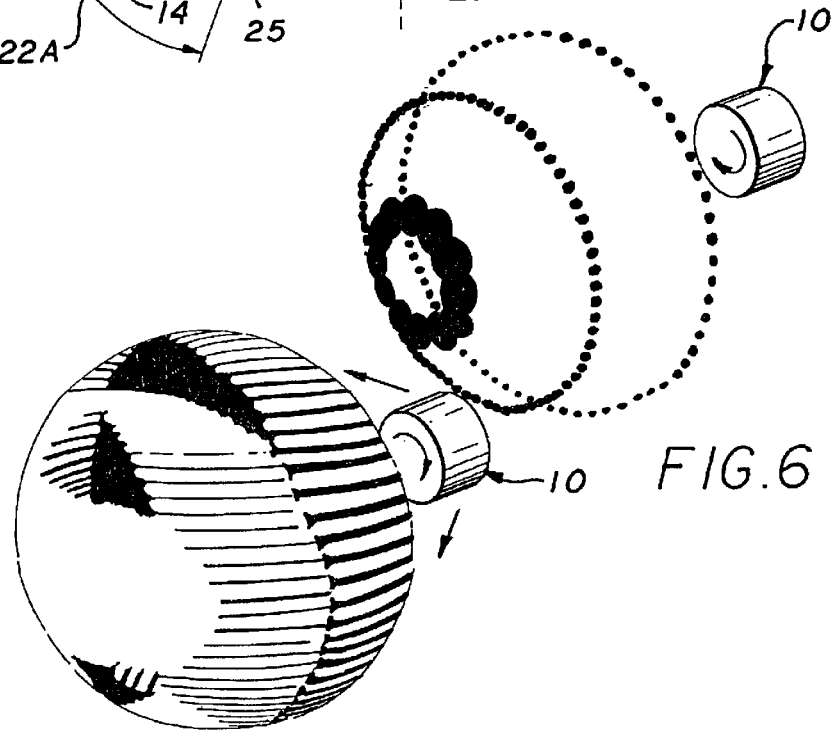
FIG. 6 is a simplified representation of the field of scanning the scanner accomplished during one revolution of the concave parabolic first reflector, convex second reflector, prism and mirror.
Figure 7:
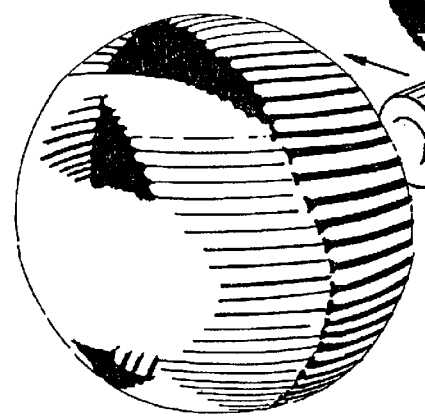
FIG. 7 is a simplified representation of the field of scanning of the scanner accomplished during continued revolution of the concave parabolic first reflector, convex second reflector, prism and mirror, and a full azimuth sweep.

In all three embodiments, as the motor 48 rotates the frame member 30, the beam 74A is directed outward from the scanner 10 in a generally conical pattern about the axis of rotation 33 and primarily used for collision avoidance. The beams 74B and 74C are also directed outward in a conical pattern, but are primarily used for situation awareness. This can be seen in FIG. 6. By rotating the housing in azimuth as shown in FIG. 1, a more complete scanning pattern shown in FIG. 7 is accomplished.

It is understood that the exemplary tilted primary clamshell lens laser scanner described herein and shown in the drawings represents only presently preferred embodiments of the invention. Indeed, various modifications and additions may be made to such embodiments without departing from the spirit and scope of the invention. For example, the concave parabolic first reflector 40 and the convex parabolic reflector 52 may be comprised of various different materials. Also, various different types of reflective surfaces may be formed thereupon so as to effect desired reflection therefrom. Further, as those skilled in the art will appreciate, various different types of radiated energy may be utilized according to the present invention. For example, microwaves, acoustic energy, visible light, infrared, ultraviolet, etc. may be utilized.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A scanner for transmitting at least two generally collimated beams of radiation of different frequencies such that the beams rotate about an axis to form a conical scanning pattern, the scanner comprising:

a housing;

a frame member rotatably mounted within said housing having an axis of rotation;

motor for rotating said frame member about said axis of rotation;

a concave parabolic first reflector having a geometric axis and a focus mounted to said frame member with said geometric axis angularly offset from said axis of rotation, said first reflector having an opening near said axis of rotation;

a convex parabolic second reflector mounted to said frame member disposed along the rotation axis of said reflector and having a focus which is approximately co-located with the focus of said first reflector, said second reflector adapted to transmit at least one of the collimated beams of radiation and to reflect at least one of the collimated beams of radiation;

a collimating lens disposed in proximity to said opening formed in said first reflector directing the at least two collimated beams of radiation through said opening formed in said first reflector and onto said second reflector;

means for diffracting the at least one collimated beam of radiation transmitted through said second reflector outward from said axis of rotation such that as said frame member rotates the at least one beam of radiation transmitted through said second reflector is transmitted in a conical pattern.

2. The scanner as recited in claim 1 wherein said means comprises:

a prism mounted behind said second reflector co-incident therewith and mounted to said frame member, said prism for diffracting the at least one collimated beam of radiation transmitted through said second reflector; and a mirror mounted behind said prism for reflecting said at least one collimated beam of radiation diffracted by said prism radically outward from said axis of rotation to said diffraction means; and a diffraction grating mounted on said housing and extending about said axis of rotation for diffracting the at least one collimated beam of radiation reflected from said mirror.

3. The scanner as recited in claim 1 wherein said means comprises a diffraction grating mounted to said second reflector for diffracting the at least one collimated beam of radiation transmitted through said second reflector.

4. The scanner as set forth in claim 3 comprising:

said first reflector adapted to reflect at least two beams of collimated radiation to said second reflector; and a second diffraction grating located in said frame assembly adapted to refract the at least two beams of collimated ration reflected off said second reflector.

5. A scanner for transmitting at least two generally collimated beams of radiation of different frequencies such that the beams rotate about an axis to form a conical scanning pattern, the scanner comprising:

a housing;

a frame member rotatably mounted within said housing having an axis of rotation;

motor for rotating said frame member about said axis of rotation;

a concave parabolic first reflector having a geometric axis and a focus mounted to said frame member with said geometric axis angularly offset from said axis of rotation, said first reflector having an opening near said axis of rotation;

a convex parabolic second reflector mounted to said frame member disposed along the rotation axis of said reflector and having a focus which is approximately co-located with the focus of said first reflector, said second reflector adapted to transmit at least one of the collimated beams of radiation and to reflect at least one of the collimated beams of radiation;

a collimating lens disposed in proximity to said opening formed in said first reflector directing the at least two collimated beams of radiation through said opening formed in said first reflector and onto said second reflector;

a prism mounted behind said second reflector co-incident therewith and mounted to said frame member, said prism for diffracting the at least one collimated beam of radiation transmitted through said second reflector; and a mirror mounted behind said prism for reflecting said at least one collimated beam of radiation diffracted by said prism radically outward from said axis of rotation; and a diffraction grating mounted on said housing and extending about said axis of rotation for diffracting the at least one collimated beam of radiation reflected from said mirror.

6. A scanner for transmitting at least two generally collimated beams of radiation of different frequencies such that the beams rotate about an axis to form a conical scanning pattern, the scanner comprising:

a housing;

a frame member rotatably mounted within said housing having an axis of rotation;

motor for rotating said frame member about said axis of rotation;

a concave parabolic first reflector having a geometric axis and a focus mounted to said frame member with said geometric axis angularly offset from said axis of rotation, said first reflector having an opening near said axis of rotation;

a convex parabolic second reflector mounted to said frame member disposed along the rotation axis of said reflector and having a focus which is approximately co-located with the focus of said first reflector, said second reflector adapted to transmit at least one of the collimated beams of radiation and to reflect at least one of the collimated beams of radiation;

a collimating lens disposed in proximity to said opening formed in said first reflector directing the at least two collimated beams of radiation through said opening formed in said first reflector and onto said second reflector; and a diffraction grating mounted to said second reflector for diffracting the at least one collimated beam of radiation transmitted through said second reflector.

7. The scanner as set forth in claim 6 comprising:

said first reflector adapted to reflect at least two beams of collimated radiation to said second reflector; and a second diffraction grating located in said frame assembly adapted to refract the at least two beams of collimated ration reflected off said second reflector.

* * * * *